Patented Aug. 11, 1953

2,648,651

UNITED STATES PATENT OFFICE 2,648,651

METHODS OF AND MEANS FOR THE PROTECTION OF MATERIALS AND EQUIPMENT SENSITIVE TO THE ACTION OF WATER, MOISTURE AND MOLD GROWTH

Lucienne Anne Marguerite Casati, Vincennes, Jean Louis Gonnard, Villeurbanne, and Joseph Edouard Gustave Lahousse, Lyon, France, assignors to Societe Des Usines Chimiques Rhone-Poulenc No Drawing. Application February 5, 1951, Serial No. 209,522. In France February 13, 1950

7 Claims. (Cl. 260—31.8)

The present invention relates to the protection against the individual or simultaneous action of water or moisture and micro-organisms, of materials or equipment likely to be affected by such action. This protection may be applied both to the production of fluid-tight packages of the "tropical" type and to the maintenance of insulation employed in the electrical or radio arts under unfavourable climatic conditions.

In the specification of co-pending application Serial No. 64,257, now Patent Number 2,635,085, we have described a new composition for the insulation and protection of electrical equipment and methods of applying this composition, which essentially comprises a dispersion of 40–50 parts of polyvinyl chloride in a mixture of 25 to 35 parts of pitch and 15–35 parts of plasticiser, if desired with an addition of a fungicide. This composition provides, on baking at temperatures not exceeding 80° C., and application to the equipment to be protected, slightly plastic, non-cracking and non-adhesive coatings which afford good protection to articles against moisture, which are not attacked by moulds and which impart good electrical insulation, while being insensitive to shock.

According to the present invention, it has now been found that if in the compositions described in the aforesaid specification the pitch is replaced by a fraction of anthracene oil the resultant compositions give, upon baking, coatings having in addition to the above-mentioned advantageous properties the following additional characteristics:

a. They have little colouration and are transluscent instead of being black and opaque. Thus, for example, with thicknesses less than 0.8 mm. they are sufficiently transparent as to render visible any marks, data or inscriptions on the support to which they have been applied.

b. Not only do they withstand temperatures of up to 80° C. even in a moisture-saturated atmosphere, but they can be exposed without cracking to tempertaures of −60° C. provided that suitable plasticisers are employed. Although the compositions forming the subject of the present invention can be hardened by baking at a temperature not exceeding 80° C., in the same way as those described in the specification of co-pending application Serial No. 64257, the mechanical properties of the final products at low temperatures are definitely improved if the baking is effected at a higher temperature, for example 120°–130° C.

c. Finally, they have considerable elasticity which is greater than that of the final products described in the aforesaid specification, and their mechanical properties are, therefore, superior.

The compositions of the present invention, therefore, comprise a mixture of which the essential constituents are polyvinyl chloride, one or more plasticisers for polyvinyl chloride, and a fraction of anthracene oil.

The simultaneous presence of the stated constituents is essential for imparting to the plastic compositions resulting from the mixing and baking thereof, all the valuable mechanical and electrical properties hereinbefore specified. Thus, for example, mixtures of polyvinyl chloride and a plasticizer, which have long been employed as insulating plastics in the electrical industry, are much less hydrophobic than the compositions of the present invention. Similarly, a baked composition consisting solely of a mixture of polyvinyl chloride and fraction of anthracene oil has unsatisfactory resistance to temperatures only slightly below 0° C.

The relative proportions of the stated constituents may vary within comparatively wide limits, so that it is possible to obtain therefrom plastic compositions having mechanical properties varying according to the desired use, especially with regard to mechanical rigidity and resistance to low temperatures.

The quantity of vinyl chloride employed may vary between 25% and 65% by weight of the mixture. Very good results have been obtained with proportions lying between 34% and 55% and quantities between these limits are preferred. It has been found that with low viscosity vinyl chloride, mixtures containing less than 34% thereof have an excessive fluidity which renders it difficult to produce a uniform and simultaneous coating of all parts of a given support. Mixtures containing more than 55% by weight of polyvinyl chloride are insufficiently plasticised and are difficult to employ.

Mixtures containing from 34% to about 42% by weight of polyvinyl chloride are particularly suitable for coating parts of electrical equipment by immersion. Thicker mixtures containing for example from 42% to 55% of polyvinyl chloride have the form of highly viscous i. e. non-flowing pastes which can be employed in accordance with other usual methods of application, such as those described for example in the aforesaid specification that is, direct spreading of the paste on the article, covering of the article with sheets or strips of plastic material obtained by extrusion of the heated mass under pressure through a suitable orifice or by calendering the paste between heating rolls, or by means of strips of textile material covered with the paste and so on. Finally, mixtures containing from 55% to 65% of polyvinyl chloride which consists of powders can be applied, for example, by extrusion of the heated mass under pressure through a suitable orifice.

The total quantity by weight of the other two essential constituents of the compositions of the present invention, that is, plasticiser and a fraction of anthracene oil may vary between 35% and 75% and preferably lies between 45% and 66% of the mixture. The ratio of the quantity of said fraction of anthracene oil to that of the plasticiser must be determined by experiment according to the nature of the plasticiser, so as to obtain in each case the best possible resistance to low temperature. Thus, for example, with butyl sebacate as plasticiser, the ratio of the quantities of butyl sebacate and said fraction affording stability at low temperature is about 1:2. The optimum proportions in the case of other plasticisers are readily determined by simple preliminary experiment.

The plasticiser is preferably selected in accordance with its own dielectrical properties and with respect to its behaviour in the mixture from the viewpoint of exudation and fluidity imparted to the mixture. The range of plasticisers which can be employed is very wide. Excellent results are obtained with chlorinated aromatic hydrocarbons, such as chlorinated diphenyl or dibenzyl. Suitable esters include the adipates, and especially methylcyclohexyl adipate. The phosphoric, phthalic and sebacic esters can also be employed, as also can the naphthene hydrocarbons which can be extracted by distillation from certain petroleums, and the like. With butyl sebacate, plastics can be obtained which undergo without cracking three successive cycles between temperatures of −60° and +100° C. in an atmosphere of saturated steam.

Stabilisers for polyvinyl chloride, pigments, loading agents or fillers, fungicides and the like may also be incorporated in the mixture, due regard being had to the modifications which these substances may produce in the electrical or mechanical properties of the compositions of the present invention.

Particularly active fungicides include those forming the subject of co-pending application No. 186,122, that is to say, the volatile liposoluble but water-insoluble substances which can be extracted from coal tars and especially the monomethyl naphthalenes, methoxy methyl naphthalenes, methyl diphenyls, thionaphthene and the mixtures containing them, such as the anthracene oil fraction boiling between 95° and 130° C. under 10 mm. pressure and also the ethoxymethyl naphthalenes.

It should be noted that crude anthracene oils normally commercially available are unsuitable for the purpose of the present invention. Apart from the fact that in general they have poor dielectric properties they usually possess or evolve an intolerable odour which excludes their commercial use for many of the purposes contemplated in the present specification. These crude fractions which vary greatly according to their origin and the process of preparation must, therefore, in order to be useful for the purpose of this invention be refined primarily with the object of increasing their hydrocarbon content.

The refining treatment applied will depend upon the origin and pre-treatment or process of preparation of the crude oil and also upon the properties desired of the composition in which the refined oil is to be incorporated. If all of the properties hereinbefore described are required in the composition, the oil employed should be subjected to all of the following treatment steps, each known in itself:

1. Elimination of the phenols by alkaline treatment, for example with caustic soda.
2. Elimination of the amines by acid treatment, for example with sulphuric acid, first dilute and then concentrated.
3. Desulphurisation, for example by treatment with aluminum chloride at a temperature of about 80° or 100° C.
4. Adsorption on about 10% to 20% of its weight of an adsorbent such as an adsorbent earth, for example, adsorbent silicate ("Clarsil") or by adsorbent alumina.
5. Elimination by fractional distillation in vacuo of the fractions distilling between 130° and 180° C. under a pressure of 10 mm. of mercury.

Of these treatment steps, 1, 2 and 3 are essential for the purpose of this invention. The first and second treatment steps eliminate products having substantial electrical conductivity and a detrimental tendency to absorb moisture. The third step removes products which cause the oil to blacken considerably by oxidation on exposure to the atmosphere. The fourth step eliminates not only coloured products but above all substances which impart to the oil a high-co-efficient of dielectric loss (tan $\gamma$) lowering the electrical resistivity. The fifth step frees the oil from substances which would impart to the unbaked plastics a thixotropy harmful in storage and the use of the articles by immersion. The oil finally obtained has no appreciable odour.

It is advantageous to precede the aforesaid treatments by cooling the oil at −15° C., the effect of which is to produce crystallisation of the anthracene and carbazole contents, which can thus be separated. By-products of high commercial value are thus separated, the presence of which, if left in the compositions according to the present invention, would bring about as a result of crystallisation a considerable reduction at temperatures below room temperature in the mechanical properties of these compositions.

It is unnecessary to describe the preceding treatment steps in detail, these being well known per se. It should be noted that, if enhanced stability of the baked compositions at low temperature is required, it is preferable to eliminate by distillation oil fractions distilling below 180° C. under 10 mm. of mercury. If, on the other hand, fungicidal action is required and the final compositions is not required to have such enhanced stability at very low temperature, it is necessary to retain the fractions distilling below 130° C., preferably those distilling between 95° and 130° C., under 10 mm. of mercury.

The application of the compositions of the present invention to the surfaces to be protected can be effected in many different ways, as has already been stated. In the particular case of the coating of articles by immersion, one advantageous application of the coating mixture is as follows: As the consistency of the unbaked product must not be too high and on the other hand the viscosity of the whole must nevertheless be sufficient to eliminate the tendency of the polyvinyl chloride, which is of greater density than the remainder of the composition, to separate during the operation of immersing the articles, the coating solution is prepared by mixing its constituents with an initial polyvinyl chloride plastic composition which has been previously baked and cooled.

At the relatively high temperatures which may be reached in tropical climates during the hot seasons, an incipient exudation of the unbaked compositions is sometimes observed under the conditions of prolonged storage. In order to avoid this disadvantage, it is possible, instead of preparing the unbaked composition as hereinbefore described to prepare it in two parts which do not exudate and which are mixed only at the time of use. The first part, which is solid, consists of polyvinyl chloride impregnated in the cold state to the extent of about 20% of its weight with a baked and cooled polyvinyl chloride plastic as described with reference to the compositions for coating by immersion. The second part, which is liquid, comprises the remainder of the composition, that is to say, essentially the plasticiser or plasticisers and the fraction of anthracene oil.

The baking intended to impart the final consistency to the compositions of the invention is effected by subjecting the compositions to a temperature which may vary from 75° to 150° C. for a time varying between 1 and 3 hours. The optimum temperature conditions and the optimum baking period can readily be determined by any person skilled in the art in each particular case, so as to obtain, for example, either the maximum elastic elongation, or the best stability at low temperatures (absence of cracking).

In the following examples, which are intended to illustrate and not to limit the present invention, the parts are understood to be by weight.

*Example I*

A mixture of the following composition is baked at 100° C. for about 1 to 2 hours:

| | Parts |
|---|---|
| Polyvinyl chloride of low viscosity | 1.5 |
| Butyl sebacate | 12.5 |
| Stabiliser | 1.0 |

To the homogeneous liquid obtained, there are added with agitation after cooling, in the following order:

| | Parts |
|---|---|
| Anthracene oil hydrocarbons | 38 |
| Monomethyl naphthalene | 10 |
| Polyvinyl chloride | 37 |

A homogeneous fluid suspension is thus obtained, which is well suited for coating articles by immersion. When the articles are coated, baking for 3 hours at 80° C. (in the case of articles consisting of or containing cellulose) or 2 hours at 120° C., converts the suspension into a translucent plastic, which is hard, hydrophobic and a good electric insulator.

*Example II*

A mixture having the following composition is baked for 1 hour at 100° C.:

| | Parts |
|---|---|
| Polyvinyl chloride (low viscosity) | 1.5 |
| Butyl sebacate | 10.5 |
| Stabiliser | 1.0 |

After cooling, the following products are added:

| | Parts |
|---|---|
| Anthracene oil hydrocarbons | 31.0 |
| Thionaphthene | 10.0 |
| Polyvinyl chloride (low viscosity) | 46.0 |

A non-flowing paste is thus obtained which may be advantageously employed to fill up orifices and which is converted into hard plastic after baking as in Example I.

*Example III*

A mixture is prepared in the following order:

| | Parts |
|---|---|
| Polyvinyl chloride of high viscosity | 49 |
| Dioctyl phosphate | 9 |
| Pentachloro-diphenyl | 4 |
| Anthracene oil hydrocarbons | 37 |
| Stabiliser | 1 |

A paste is thus obtained which can be readily converted into a strip by extrusion or into sheets by calendering. On adjustment of the working temperature of such apparatus in accordance with the usual method to 120°–160° C., the plastic is obtained directly in the final elastic form.

A strip of a thickness of $\tfrac{5}{10}$ of a millimetre formed of the plastic thus obtained, bends without breaking even at a temperature of −35° C. It may be employed to cover by lap winding elements to be protected from moisture.

*Example IV*

A mixture of the following composition is baked for 1 to 2 hours at about 100° C.:

| | Parts |
|---|---|
| Polyvinyl chloride of low viscosity | 1.5 |
| Butyl sebacate | 12.5 |
| Stabiliser | 1.0 |

To the homogeneous liquid thus obtained, there are added with agitation, after cooling, in the following order:

| | Parts |
|---|---|
| Anthracene oil hydrocarbons | 38 |
| Anthracene oil hydrocarbon fraction (distilling below 149° C. under 10 mm.) | 10 |
| Polyvinyl chloride | 37 |

The product is treated as in Example I and a plastic is obtained which has the same properties as the product of Example I and has good fungicidal action.

Sheets of from $\tfrac{2}{10}$ to $\tfrac{15}{10}$ of a millimetre in thickness formed of the plastic thus obtanied may be employed for the production of packings, envelopes, bags and boxes of all forms and of all dimensions, rendered fluid-tight by edge-to-edge welding, for example by means of the usual high-frequency apparatus. Such envelopes may advantageously be employed as an internal or external lining for cases or packings, in order to render them water-tight or moisture-tight and to afford protection to the contents against fungal or mould growth.

We claim:

1. A composition for the protection of materials or equipment against the action of water which comprises as its essential constituents between 25% and 65% by weight of polyvinyl chloride and between 25 and 75% by weight of a mixture of a fraction of anthracene oil substantially free from anthracene itself and from phenols, amines and sulphur compounds and boiling at 95 to 130° C. under 10 mm. of mercury and at least one plasticiser for polyvinyl chloride.

2. A composition for the protection of articles against the action of water which comprises as its essential constituents between 25 and 65% by weight of polyvinyl chloride, and between 35 and 75% by weight of a mixture of a fraction of anthracene oil which is substantially free from anthracene itself and from phenols, amines and sulphur compounds and boiling at 95 to 130° C. under 10 mm. pressure of mercury, and a proportion of butyl sebacate of the order of half the weight of the fraction of anthracene oil present.

3. A composition for the protection of articles against the action of water which comprises as its essential constituents between 25 and 65% by weight of polyvinyl chloride, and a plasticiser and a fraction of anthracene oil together constituting 45 to 66% by weight of the composition, the said fraction of anthracene oil being substantially free from anthracene itself and from phenols, amines and sulphur compounds and boiling at 95 to 130° C. under 10 mm. pressure of mercury.

4. A hard baked composition for the protection of articles against the action of water which comprises as its essential constituents between 25 and 65% by weight of polyvinyl chloride, and between 35 and 75% by weight of a mixture of a fraction of anthracene oil which is substantially free from anthracene itself and from phenols, amines and sulphur compounds and boils at 95 to 130° C. under 10 mm. pressure of mercury, and at least one plasticiser for polyvinyl chloride.

5. A method for producing a composition for the protection of articles against the action of water which comprises mixing between 35 and 75% by weight of a mixture of a fraction of anthracene oil substantially free from anthracene itself and from phenols, amines and sulphur compounds and boiling at 95 to 130° C. under 10 mm. pressure of mercury and at least one plasticiser for polyvinyl chloride, with a liquid plasticised polyvinyl composition which has previously been baked and cooled.

6. A method for the production of electrical and other equipment especially under tropical conditions which comprises applying to the parts to be protected a composition which comprises as its essential constituents between 25 and 65% by weight of polyvinyl chloride, and between 35 and 75% by weight of a mixture of a fraction of anthracene oil which is substantially free from anthracene itself and from phenols, amines and sulphur compounds and boils at 95 to 130° C. under 10 mm. pressure of mercury, and at least one plasticiser for polyvinyl chloride, and converting such composition in situ into a hard mass by baking it at a temperature between 75 and 150° C.

7. Sheets, strips and other formed shapes for the protection of articles against damage by water, dielectric loss due to moisture and against fungicidal and mould growth which comprise as essential constituents between 25 and 65% by weight of polyvinyl chloride and between 35 and 75% by weight of a mixture of a fraction of anthracene oil which is substantially free from anthracene itself and from phenols, amines and sulphur compounds and boils at 95 to 130° C. under 10 mm. pressure of mercury and at least one plasticiser for polyvinyl chloride.

LUCIENNE ANNE MARGUERITE CASATI.
JEAN LOUIS GONNARD.
JOSEPH EDOUARD GUSTAVE LAHOUSSE.

References Cited in the file of this patent

FOREIGN PATENTS

| Number | Country | Date |
|--------|---------|------|
| 594,372 | Great Britain | Nov. 10, 1947 |
| 926,509 | France | Apr. 21, 1947 |